US008782270B2

(12) United States Patent
Sathianathan et al.

(10) Patent No.: US 8,782,270 B2
(45) Date of Patent: Jul. 15, 2014

(54) METHOD AND SYSTEM FOR STREAMING LIVE TELECONFERENCING FEEDS TO MOBILE CLIENT DEVICES

(75) Inventors: Brian Sathianathan, Morgan Hill, CA (US); Arulkumaran Chandrasekaran, Sunnyvale, CA (US); Ben Truong, San Jose, CA (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 102 days.

(21) Appl. No.: 13/155,190

(22) Filed: Jun. 7, 2011

(65) Prior Publication Data

US 2012/0317299 A1    Dec. 13, 2012

(51) Int. Cl.
*G06F 15/16* (2006.01)

(52) U.S. Cl.
USPC ............................................ 709/231; 709/204

(58) Field of Classification Search
USPC ........................................................ 709/231
See application file for complete search history.

(56) References Cited

U.S. PATENT DOCUMENTS

| | | | | |
|---|---|---|---|---|
| 6,590,604 B1 * | 7/2003 | Tucker et al. | ............... | 348/14.13 |
| 6,990,203 B2 * | 1/2006 | Glaab | ............................ | 380/210 |
| 7,941,181 B2 * | 5/2011 | Drackett et al. | ........... | 455/556.2 |
| 7,984,179 B1 * | 7/2011 | Huang | .......................... | 709/233 |
| 8,294,772 B2 * | 10/2012 | Duvanenko et al. | .......... | 348/192 |
| 8,300,082 B2 * | 10/2012 | Malik | ......................... | 348/14.08 |
| 2003/0121043 A1 * | 6/2003 | Reinold et al. | .................. | 725/62 |
| 2006/0192849 A1 * | 8/2006 | Inoue | ......................... | 348/14.08 |
| 2009/0019176 A1 * | 1/2009 | Debrosse | ...................... | 709/231 |
| 2010/0097438 A1 * | 4/2010 | Ujii | ............................. | 348/14.01 |
| 2010/0115051 A1 * | 5/2010 | Robert et al. | ................. | 709/217 |
| 2010/0149302 A1 * | 6/2010 | Malik | ......................... | 348/14.08 |
| 2011/0276585 A1 * | 11/2011 | Wagner et al. | ................ | 707/769 |

FOREIGN PATENT DOCUMENTS

| WO | WO 02/44828 | 6/2002 |
|---|---|---|
| WO | WO 2008/019150 | 2/2008 |

* cited by examiner

*Primary Examiner* — Guang Li
(74) *Attorney, Agent, or Firm* — Farjami & Farjami LLP

(57) ABSTRACT

There is provided a system and method for streaming a live teleconference feed to a mobile client device. There is provided a method comprising receiving a live video feed from a video splitter concurrently outputting to a display device, converting the live video feed into an intermediate video stream, determining playback capabilities of the client device, transcoding the intermediate video stream into a final video stream based on the playback capabilities of the client device, and streaming the final video stream to the client device for output to a display of the client device. The live video feed may comprise a live video feed from a conventional teleconferencing system. In this manner, conventionally closed systems, such as teleconferencing systems, may be augmented to support live video streaming and collaboration with various remote client devices.

26 Claims, 3 Drawing Sheets

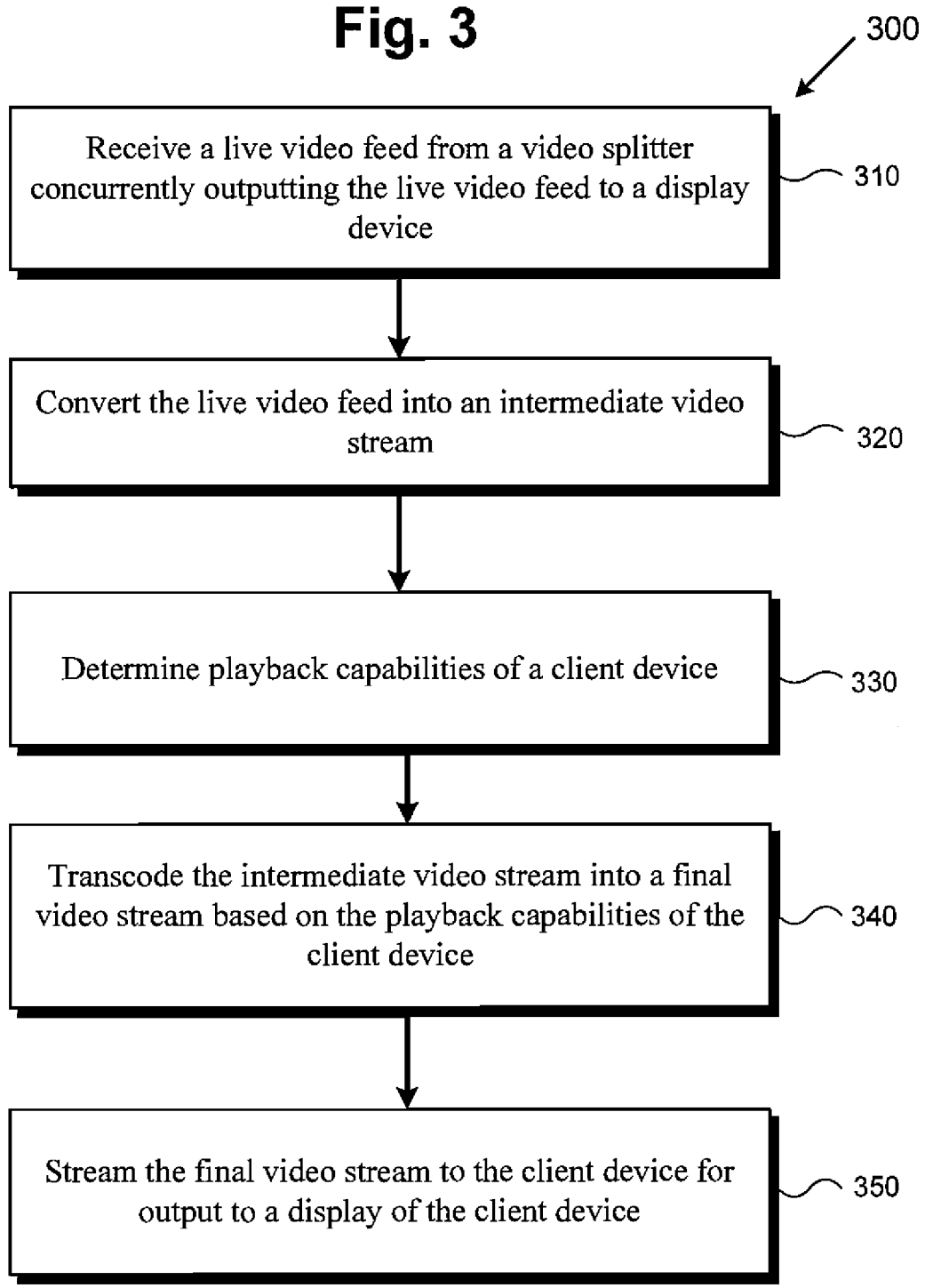

US 8,782,270 B2

METHOD AND SYSTEM FOR STREAMING LIVE TELECONFERENCING FEEDS TO MOBILE CLIENT DEVICES

BACKGROUND OF THE INVENTION

1. Field of the Invention

The present invention relates generally to streaming live feeds. More particularly, the present invention relates to streaming live feeds to mobile client devices.

2. Background Art

Real time communication between multiple parties located in separate geographical locations can be easily accomplished through the use of teleconference systems. Participants may use a teleconference system at one location to generate and deliver telecommunication information, such as a live video feed, to teleconference systems at other locations. By using existing public networks such as the Internet, teleconference systems can be readily implemented without building an expensive proprietary network, allowing for cost effective real-time communication between distant participants.

Recent solutions for video teleconferencing include Cisco's "Telepresence Recording Server", which allows participants to create and send high quality video feeds to other Cisco telecommunication servers. A related solution is Cisco's "Media Experience Engine (MXE) Series", which allows a live feed or recorded videos of a teleconferencing system to be streamed to local desktop computers.

However, currently available teleconferencing systems, including the above solutions, are unable to accommodate remote participants who are outside the vicinity of such system installations. Participants must be physically present in the vicinity of the teleconferencing system installation. However, situations often arise where the participation and feedback of a remote participant is desirable, for example a person that may be away on travel, in a meeting, at a remote client site, in a vehicle or on a flight, or in another location that is outside the range of the teleconferencing installation.

Accordingly, there is a need to overcome the drawbacks and deficiencies in the art by providing a method of streaming live video feeds, such as a live teleconference feed, to remote participants.

SUMMARY OF THE INVENTION

There are provided methods and systems for streaming a live teleconference feed to a mobile client device, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 3 shows a flowchart describing the steps, according to one embodiment of the present invention, by which a live teleconference feed may be streamed to a mobile client device.

DETAILED DESCRIPTION OF THE INVENTION

The present application is directed to a method and system for streaming low latency live teleconferencing feeds to a mobile device through a network. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
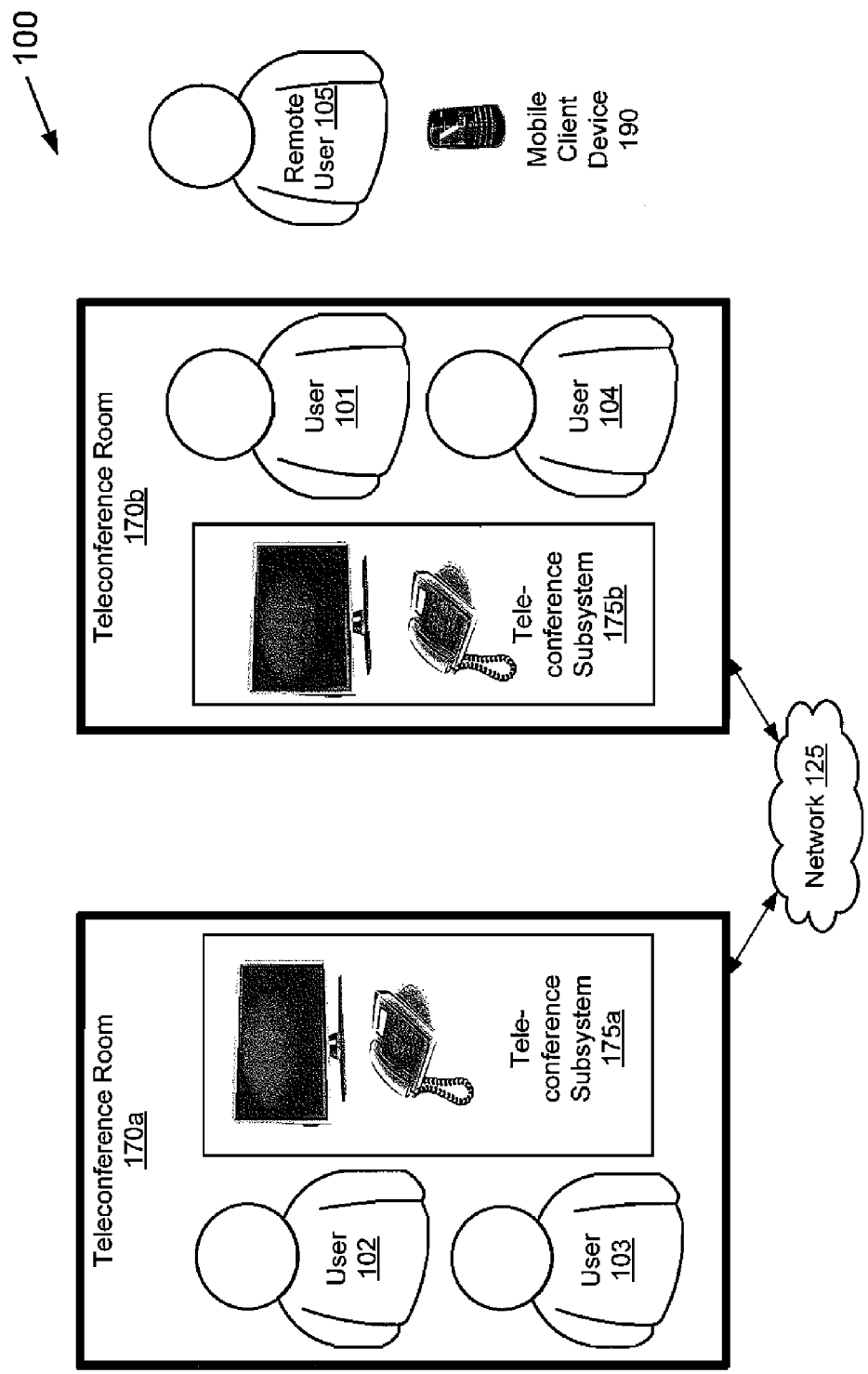
FIG. 1 presents a diagram of a conventional teleconferencing system.

FIG. 1 presents a diagram of a conventional teleconferencing system. Diagram 100 includes teleconference room 170a and 170b, mobile client device 190, network 125, and remote user 105. Teleconference room 170a includes user 102 and 103 and teleconference subsystem 175a. Teleconference room 170b includes user 101 and 104 and teleconference subsystem 175b.

The conventional teleconferencing system of FIG. 1 allows users to participate in a conference wherever a teleconference subsystem is installed. Teleconference rooms 170a and 170b may be remotely located from each other. Accordingly, users 102 and 103 may participate in a conference using teleconference subsystem 175a, and users 101 and 104 may participate in the same conference using teleconference subsystem 175b. Teleconference system 175a and 175b may be implemented from any combination of teleconference hardware devices such as, for example, laptop computers, desktop computers, video cameras, web cameras, video projectors, microphones, voice over Internet Protocol (VoIP) telephones, and conferencing software. Teleconference system 175a and 175b may exchange data through network 125, which may comprise a public network such as the Internet, a cellular network, or a proprietary network.

Remote user 105 may be traveling, attending an outside meeting, visiting a client site, or otherwise unable to attend teleconference room 170a or 170b in person. In many situations, it may be desirable to allow remote user 105 to participate in a conference. However, with conventional teleconferencing systems, participating users must be in physical proximity to a teleconferencing subsystem installation, such as teleconference subsystem 175a or 175b. Since conventional teleconferencing systems are designed as closed systems where only vendor specific solutions may interoperate, conference access may be denied to unsupported devices, such as mobile client device 190. Thus, unless remote user 105 travels to teleconference room 170a or teleconference room 170b, remote user 105 may be unable to participate in the conference. Remote user 105 and other remote users are thus unable to provide valuable conference feedback and participation.

Figure 2:
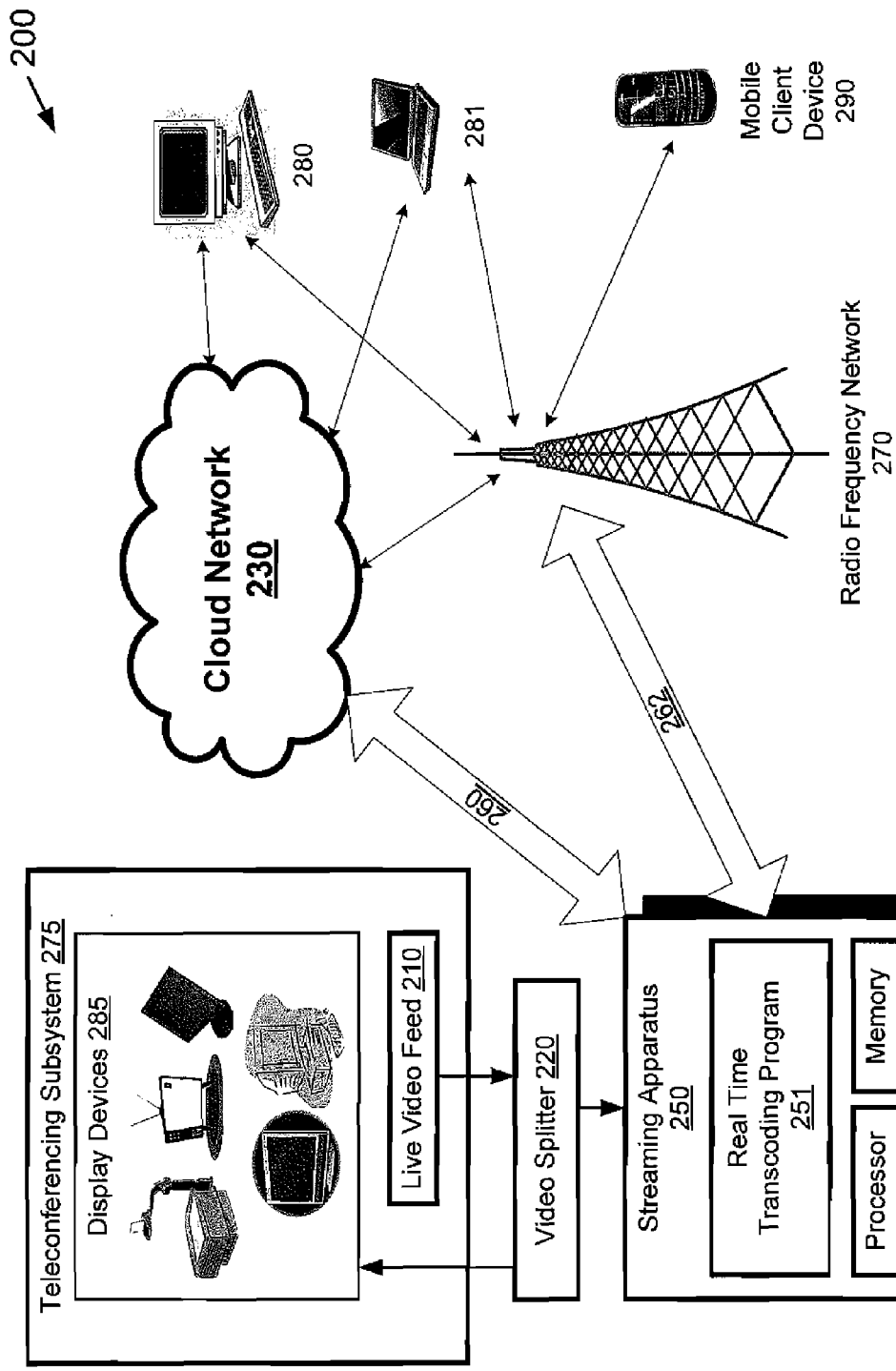
FIG. 2 presents a diagram of a system for streaming a live teleconference feed to a mobile client device, according to one embodiment of the present invention.

Accordingly, turning to FIG. 2, FIG. 2 presents a diagram of a system for streaming a live teleconference feed to a mobile client device, according to one embodiment of the present invention. Diagram 200 of FIG. 2 includes teleconferencing subsystem 275, video splitter 220, streaming apparatus 250, cloud network 230, data link 260 and 262, radio frequency network 270, desktop computer 280, portable computer 281, and mobile client device 290. Teleconferencing subsystem 275 includes live video feed 210 and display devices 285. Streaming apparatus 250 includes real time transcoding program 251, processor 252, and memory 253. With regards to FIG. 2, mobile client device 290 may correspond to mobile client device 190 of FIG. 1, and teleconferencing subsystem 275 may correspond to teleconferencing subsystem 175a or 175b of FIG. 1

Live video feed 210 may comprise a video stream that is captured in real-time, such as an in-progress teleconference session. Conventionally, live video feed 210 may be directly connected to one or more of display devices 285 within teleconferencing subsystem 275. Display devices 285 may include one or more video projectors, standard definition televisions, LCD monitors, high definition televisions (HDTVs), CRT monitors, or other displays. Using a teleconferencing system similar to that as shown in FIG. 1, local conference participants using teleconferencing subsystem 275 may observe local and/or remote conference participants live on display devices 285. However, as previously discussed, a remote user using mobile client device 290 may be unable to participate in the conference when conventional conferencing systems are utilized.

Accordingly, video splitter 220 and streaming apparatus 250 are introduced to create a video signal processing and distribution chain. Video splitter 220 may be equipped with one or more audio/video interfaces including high-definition multimedia interface (HDMI), digital visual interface (DVI), video graphics array (VGA), S-video, and/or component video. Video splitter 220 receives live video feed 210 in one of the above A/V interfaces and provides a duplicated video signal concurrently to display devices 285 and to streaming apparatus 250.

Streaming apparatus 250 may comprise, for example, a server computer with video capture hardware. The video capture hardware of streaming apparatus 250 may include similar A/V interfaces as video splitter 220. Streaming apparatus 250 may be managed through a web user interface (UI), extensible markup language (XML) application programming interface (API), command line interface (CLI), or other interfaces. Additionally, streaming apparatus 250 can be monitored using a web UI, XML API, simple network management protocol (SNMP), memcached based output, electronic mail (e-mail), CLI, or other monitoring solutions.

Streaming apparatus 250, using processor 252, may execute real time transcoding program 251 to encode live video feed 210 in real-time, which may then be further stored and/or transmitted across cloud network 230 and/or radio frequency network 270 to various client devices. As shown in FIG. 2, the transmission may occur over a combination of both cloud network 230 and radio frequency network 270. Streaming apparatus 250 may use, for example, the hypertext transfer protocol (HTTP) or real time streaming protocol (RTSP) when publishing the transcoded live video feed 210. Real time transcoding program 251 may detect when a valid video signal is being received from video splitter 220 to begin a transmission session performing real-time video transcoding for storage or distribution, and may also detect an absence of a valid video signal to end the transmission session. Real time transcoding program 251 may also update a log including transmission session timestamps, video input and transcoding formats, client streaming session data and statistics, and other metadata for each transmission session.

During the transmission session, real time transcoding program 251 may convert live video feed 210 into an intermediate video stream in real time, which may comprise encoding to a specific video codec standard, audio codec standard, output resolution, frame rate, or another output specification. In some embodiments of the invention, real time transcoding program 251 may also record the intermediate video stream to local or network storage.

The intermediate stream and recorded video may be streamed and recorded using any appropriate file container such as a Smith Micro Proprietary Format, Flash Video (FLV), Windows Media Video (WMV), Third Generation Partnership Project file format (3GP), audio video interleave (AVI), and others. The recorded video may also be further transcoded into another output specification if necessary, for example transcoded into a lower quality stream to preserve storage space or network bandwidth.

For transcoding, the video codec standard may comprise H.264, H.263, Moving Pictures Expert Group 4 (MPEG-4), or another video codec. The audio codec standard may comprise advanced audio coding (AAC), adaptive multi-rate (AMR), MPEG-1 or MPEG-2 audio layer 3 (MP3), or another audio codec. Output resolution may comprise 1080 p, 720 p, 480 p, 360 p, or another resolution. Frame rate may comprise 60 frames per second (fps), 30 fps, 24 fps, 15 fps or another frame rate.

Streaming apparatus 250 may support streaming to multiple client devices comprising various hardware architectures, including mobile client device 290, desktop computer 280, and portable computer 281. Mobile device 290 may comprise any handheld device including a mobile phone, a smartphone, or a handheld videogame device. Desktop computer 280 may comprise, for example, a personal computer or a workstation. Portable computer 281 may comprise, for example, a laptop or a tablet PC.

For streaming to remote client devices such as mobile client device 290, desktop computer 280, and portable computer 281, streaming apparatus 250 may rely on various distribution networks including cloud network 230 and radio frequency network 270. Cloud network 230 may comprise, for example, a cluster of servers hosted on a public network such as the Internet. Radio frequency network 270 may comprise, for example, a private cellular network.

After receiving a stream request from a remote client, streaming apparatus 250 may generate a video stream tailored to the specific hardware configuration and network connection of the remote client. The request may be received, for example, from a web based user interface or a dedicated client side application. The network connectivity of the remote client device, including downlink speed, may be measured. To reduce latency, the stream request may be serviced from a specific server on cloud network 230 having the shortest ping time to the remote client device. Furthermore, the specific playback capabilities of the client device may be determined, which may include processor speed, hardware accelerated decoding capabilities, display resolution and refresh rate, color depth and color space, and other information. The playback capabilities may be extracted from metadata included in the stream request, for example.

Real time transcoding program 251 of streaming apparatus 250 may then transcode the intermediate video stream into a final video stream to respond to the stream request, wherein the final video stream has optimized video quality based on the playback capabilities of the client device while factoring in prevailing network conditions. For example, if a client device includes a display with a 720 P resolution and a 60 hertz refresh rate, then a 720 P/60 FPS stream may be provided. However, if the network connectivity of the client device is insufficient to support a sufficient bitrate for acceptable encoding quality, the quality of the final video stream may be downgraded as necessary, for example by lowering resolution to 480 P or lowering framerate to 30 FPS.

Additionally, to support adaptive streaming, the encoding parameters of the final video stream may be dynamically modified during streaming to accommodate changes and fluctuations in client network connectivity. In this manner, adaptive streaming may improve the end user experience by reducing freezing, stuttering, and other audio/video artifacts of the final video stream that may result from network buffer underruns.

After streaming apparatus 250 transcodes the intermediate video stream into a final video stream, streaming apparatus 250 may be ready to stream the final video stream to the requesting remote client device through cloud network 230, radio frequency network 270, and/or another network. As shown in FIG. 2, the streaming may occur over a combination of both cloud network 230 and radio frequency network 270. Cloud network 230 may also include a secure cloud based network, for example to limit conference access to authorized clients only. If cloud network 230 includes a secure cloud based network, then streaming apparatus 250 may use an encrypted channel, such as HTTPS, to securely authenticate the credentials of a requesting client device and to transmit the final video data stream. Thus, mobile client device 290, desktop computer 280, portable computer 281, and other remote client devices may advantageously participate in a live conference, optionally in a secure manner, without being in local proximity to teleconferencing subsystem 275.

While only a single teleconferencing subsystem 275 is shown in FIG. 1, in alternative embodiments multiple conferencing subsystems may be supported. For example, a central streaming apparatus in cloud network 230 may receive intermediate video streams from streaming apparatuses of a plurality of teleconferencing subsystems. The central streaming apparatus may then process the intermediate video streams in real-time, for example by implementing a split screen or picture-in-picture display, thereby allowing remote client devices to observe multiple live conferences concurrently. Additionally, while only three remote client devices are shown, cloud network 230 may be scaled as necessary to support a large number of client devices concurrently, such as 500, 2500, or more client devices.

Furthermore, in some embodiments of the invention, streaming apparatus 250 or the central streaming apparatus may also receive participatory responses or feedback from remote client devices. For example, mobile client device 290 may include a microphone, a camera, a touchscreen or a tablet to allow user input in the form of audio, video, drawings or text. This user input may be transmitted as a separate stream or mixed with one or more of the intermediate video streams and distributed through cloud network 230, radio frequency network 270, and/or other networks to other client devices. As shown in FIG. 2, user input may be transmitted over a combination of both cloud network 230 and radio frequency network 270. Additionally, in some embodiments, a supplementary client device may be added to conferencing subsystem 275 to receive and display the transmitted user input, allowing local conference participants to also observe reactions and feedback from remote users in real-time. The supplementary client device, not shown in FIG. 2, may be connected to one of the display devices 285.

As discussed above, the live video is supplied from a closed teleconference system. Further, an input may be received from the client device in response to the live video stream, where such input is integrated into the live video.

Moving to FIG. 3, FIG. 3 shows a flowchart describing the steps, according to one embodiment of the present invention, by which a live teleconference feed may be streamed to a mobile client device. Certain details and features have been left out of flowchart 300 that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300.

Referring to step 310 of flowchart 300 in FIG. 3 and diagram 200 of FIG. 2, step 310 of flowchart 300 comprises processor 252 of streaming apparatus 250 executing real time transcoding program 251 to receive live video feed 210 from video splitter 220, wherein video splitter 220 is concurrently outputting live video feed 210 to at least one of display devices 285. As previously described, real time transcoding program 251 may detect the start of a valid video signal from video splitter 220, which corresponds to the start of step 310.

Referring to step 320 of flowchart 300 in FIG. 3 and diagram 200 of FIG. 2, step 320 of flowchart 300 comprises processor 252 converting, in real time, live video feed 210 received from step 310 into an intermediate video stream. As previously described, the intermediate video stream may be transcoded into various video codec standards and file containers. Optionally, the intermediate video stream may be stored locally or over a network.

Referring to step 330 of flowchart 300 and diagram 200 of FIG. 2, step 330 of flowchart 300 comprises processor 252 determining playback capabilities of a client device. For example, mobile client device 290 may send a stream request over cloud network 230 and/or radio frequency network 270 to streaming apparatus 250 over a web-based or client side user interface, as previously described. In response, processor 252 may, for example, read client metadata included in the stream request to determine the playback capabilities of mobile client device 290. Furthermore, the network connectivity of mobile client device 290 may be tested and analyzed, for example by conducting a connection test to determine ping time and downlink speed.

Referring to step 340 of flowchart 300 and diagram 200 of FIG. 2, step 340 of flowchart 300 comprises processor 252 transcoding the intermediate video stream from step 320 into a final video stream based on the playback capabilities determined in step 330. In this manner, a final video stream with optimized video and audio quality for mobile client device 290 may be provided. Furthermore, as previously described, the transcoding may take into consideration the network connectivity of mobile client device 290 to deliver an optimized final video stream, for example by utilizing servers of a cloud network having lower ping times to reduce latency. In alternative embodiments of the invention, the playback capabilities of the client device may be ignored, in which case a default encoding profile may be used for transcoding in step 340, and step 330 may be skipped.

Referring to step 350 of flowchart 300 and diagram 200 of FIG. 2, step 350 of flowchart 300 comprises processor 252 streaming the final video stream from step 340 for output to a display of mobile client device 290. As discussed previously, cloud network 230, radio frequency network 270, and/or another network may be utilized for streaming. Additionally, adaptive streaming may be utilized to accommodate changing network conditions. If cloud network 230 includes a secure cloud based network, then optional security features including client authentication and an encrypted transfer channel such as HTTPS may be provided.

Thus, the present invention enables remote users to advantageously participate in a conference even if the remote users are distant from teleconferencing subsystem 275. Moreover, user input from remote users may be received by streaming apparatus 250 and provided to other client devices and displays, providing a new feature of collaborative feedback from remote users. Accordingly, the present invention may greatly expand the range of locations from where participants may participate in a teleconference session.

Moreover, while the present invention has been illustrated using a conferencing system as an example, the present invention is also broadly applicable to any closed system that provides a live video feed, but does not directly support remote client devices. In this manner, various closed systems may be augmented with real-time remote client device streaming and remote user collaboration in a cost effective manner using commodity hardware. Cloud networks and distributed cloud based server networks may also be utilized to efficiently scale for any number of required concurrent clients. In this manner, vendor lock-in using high cost, limited functionality, and proprietary solutions can be advantageously avoided.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method of streaming a live video feed to a client device, the method comprising:
   receiving the live video feed from a video splitter concurrently outputting the live video feed to a display device;
   converting the live video feed into an intermediate video stream;
   determining playback capabilities of the client device using metadata included in a stream request from the client device;
   transcoding the intermediate video stream into a final video stream based on the playback capabilities of the client device, wherein the transcoding begins upon receipt of a valid video signal from the video splitter;
   streaming the final video stream to the client device for output to a display of the client device.

2. The method of claim 1, wherein the live video feed comprises a video feed of a teleconferencing system.

3. The method of claim 1, wherein the client device comprises a mobile device.

4. The method of claim 1, further comprising receiving a user input from the client device.

5. The method of claim 1, wherein the transcoding and the streaming are adaptive based on a network connectivity of the client device.

6. The method of claim 1, wherein the streaming is through a radio frequency network.

7. The method of claim 1, wherein the streaming is through a cloud network.

8. The method of claim 7, wherein the cloud network includes a secure cloud based network.

9. The method of claim 1 further comprising recording the intermediate video stream.

10. The method of claim 1, wherein the determining the playback capabilities of the client device is in response to the stream request from the client device.

11. The method of claim 1, wherein the live video is supplied from a closed teleconference system.

12. The method of claim 1 further comprising receiving an input from the client device responsive to the live video stream.

13. The method of claim 12 further comprising integrating the input of the client device into the live video.

14. A streaming apparatus for streaming a live video feed to a client device, the streaming apparatus comprising:
   a processor configured to:
      receive the live video feed from a video splitter concurrently outputting the live video feed to a display device;
      convert the live video feed into an intermediate video stream;
      determine playback capabilities of the client device using metadata included in a stream request from the client device;
      transcode the intermediate video stream into a final video stream based on the playback capabilities of the client device, wherein the transcoding begins upon receipt of a valid video signal from the video splitter;
      stream the final video stream to the client device for output to a display of the client device.

15. The streaming apparatus of claim 14, wherein the live video feed comprises a video feed of a teleconferencing system.

16. The streaming apparatus of claim 14, wherein the client device comprises a mobile device.

17. The streaming apparatus of claim 14, wherein the processor is further configured to receive a user input from the client device.

18. The streaming apparatus of claim 14, wherein the processor is configured to transcode and stream adaptively based on a network connectivity of the client device.

19. The streaming apparatus of claim 14, wherein the processor is configured to stream through a radio frequency network.

20. The streaming apparatus of claim 14, wherein the processor is configured to stream through a cloud network.

21. The streaming apparatus of claim 20, wherein the cloud network includes a secure cloud based network.

22. The streaming apparatus of claim 14, wherein the processor is further configured to record the intermediate video stream.

23. The streaming apparatus of claim 14, wherein the processor is configured to determine the playback capabilities of the client device in response to the stream request from the client device.

24. The streaming apparatus of claim 14, wherein the live video is supplied from a closed teleconference system.

25. The streaming apparatus of claim 14, wherein the processor is configured to receive an input from the client device responsive to the live video stream.

26. The streaming apparatus of claim 25, wherein the processor is configured to integrate the input of the client device into the live video.

* * * * *